United States Patent
Ferren et al.

(10) Patent No.: US 7,874,682 B2
(45) Date of Patent: Jan. 25, 2011

(54) COMPONENT DISPLAYS AND BEAMSPLITTER THAT FORM COMPOSITE IMAGE

(75) Inventors: Bran Ferren, Beverly Hills, CA (US); Clinton B. Hope, Los Angeles, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 1042 days.

(21) Appl. No.: 11/655,409

(22) Filed: Jan. 19, 2007

(65) Prior Publication Data

US 2007/0176848 A1    Aug. 2, 2007

(51) Int. Cl.
G03B 21/00 (2006.01)
G03B 21/28 (2006.01)
G02B 27/14 (2006.01)
G02B 5/30 (2006.01)
G02F 1/1335 (2006.01)

(52) U.S. Cl. .......................... 353/31; 353/99; 359/629; 359/487; 359/465; 359/583; 349/5

(58) Field of Classification Search .................. 353/31, 353/8, 98–99; 359/629, 487, 465, 583; 349/15, 349/5
See application file for complete search history.

(56) References Cited

U.S. PATENT DOCUMENTS

| | | | |
|---|---|---|---|
| 6,449,090 B1* | 9/2002 | Omar et al. | 359/465 |
| 6,703,988 B1* | 3/2004 | Fergason | 345/6 |
| 6,710,797 B1* | 3/2004 | McNelley et al. | 348/14.16 |
| 7,401,923 B2* | 7/2008 | Fergason | 353/8 |
| 2001/0038412 A1* | 11/2001 | McNelley et al. | 348/14.1 |
| 2004/0257788 A1* | 12/2004 | Huber | 362/19 |
| 2006/0268407 A1* | 11/2006 | Fergason et al. | 359/487 |

* cited by examiner

*Primary Examiner*—Georgia Y Epps
*Assistant Examiner*—Magda Cruz
(74) *Attorney, Agent, or Firm*—Patti Law Group, LLC

(57) ABSTRACT

An apparatus in one example comprises a first component display with a first display area, a second component display with a second display area, and a beamsplitter. The first component display is positioned such that the first display area is viewable through the beamsplitter as a transmitted display area. The second component display is positioned such that the second display area is viewable from the beamsplitter as a reflected display area. The first component display, the second component display, and the beamsplitter are positioned such that the beamsplitter provides a composite image of the transmitted display area and the reflected display area. The reflected display area of the composite image is at least partially offset from the transmitted display area.

28 Claims, 11 Drawing Sheets a. (FRONT VIEW)  b. (SIDE VIEW)

COMPONENT DISPLAYS AND BEAMSPLITTER THAT FORM COMPOSITE IMAGE

BACKGROUND

The increased availability of high-resolution imagery in the scientific and intelligence communities has led to an increased demand for displays capable of rendering such imagery. Conventional flat-panel displays are commonly available at resolutions up to 1600×1200 pixels, with a few displays (such as the Apple Cinema HD and IBM 221T) offering greater resolutions (2560×1600 and 3840×2400, respectively). Nonetheless, even the highest resolution single displays remain inadequate for close-in, immersive viewing of extremely high-resolution imagery.

A method of combining less expensive component displays into a large, high-resolution display would be advantageous for workstations such as those used in the intelligence and scientific communities. Abutting component displays one aside another in a tiled manner is a simple and convenient approach, but the bezel surrounding each component display does not allow for the seamless display of a single high-resolution image across the component monitors. Overlapping the bezels is possible if some component displays are positioned in a plane forward of the plane containing the remaining displays, but the resulting offset between adjacent displays interferes with the illusion of a single large display.

Gesture recognition against a changing background is known, as gesture recognition technologies are highly useful for manipulation of virtual objects and desktops. Recognition using visible light cameras is difficult, however, as accommodating the changing contrast associated with projected backgrounds is computationally expensive and unreliable. One solution is to use infrared light. Any active infrared illumination is invisible to the human eye, and the IR-sensitive camera receiving the reflected light is not affected by the projected background (assuming the visible light projector has a filter to block IR from being emitted). Infrared detection may be passive, such as a system that uses an IR camera to detect the temperature difference between a user's arm and the tabletop display. One example of a passive infrared system is disclosed by Koike et al. (Integrating Paper and Digital Information on EnhancedDesk: A Method for Realtime Finger Tracking on an Augmented Desk System, ACM Transactions on Computer-Human Interaction, Vol. 8, No. 4, December 2001, Pages 307-322). Other systems use active IR sources to illuminate a diffuser or other projection surface from the same side as an IR-sensitive camera, so that a user's hand or other object held on or near the surface reflects IR back to the camera. Sony's HoloWall and HoloTable use this method to detect gestures when a hand is between 0 and 30 cm from the surface, depending on the threshold setting.

SUMMARY

The invention in one implementation encompasses an apparatus. The apparatus comprises a first component display with a first display area, a second component display with a second display area, and a beamsplitter. The first component display is positioned such that the first display area is viewable through the beamsplitter as a transmitted display area. The second component display is positioned such that the second display area is viewable from the beamsplitter as a reflected display area. The first component display, the second component display, and the beamsplitter are positioned such that the beamsplitter provides a composite image of the transmitted display area and the reflected display area. The reflected display area of the composite image is at least partially offset from the transmitted display area.

Another implementation of the invention encompasses an apparatus. The apparatus comprises a beamsplitter positioned in a plane of symmetry between a first plane and a second plane, a first set of component displays aligned along a first line in the first plane, and a second set of component displays aligned along a second line in the second plane. The first plane is orthogonal to the second plane and the first line is parallel to the second line. Each component display of the first set of component displays comprises a light-modulating element viewable through the beamsplitter as a transmitted display area. Each component display of the second set of component displays comprises a light-modulating element viewable reflected from the beamsplitter as a reflected display area. The first set of component displays and the second set of component displays are spaced apart such that the transmitted display areas of the first set of component displays are interleaved with the reflected display areas of the second set of component displays to provide a substantially seamless composite image displayed across the first and second set of component displays.

A further implementation of the invention encompasses a method. A first component display is positioned at a forty-five degree angle to a beamsplitter such that the first component display is visible as a transmitted display area through the beamsplitter. A second component display is positioned at a forty-five degree angle to the beamsplitter and ninety degrees to the first component display such that the second component display is visible from the beamsplitter as a reflected display area and the transmitted display area is offset from the reflected display area.

DESCRIPTION OF THE DRAWINGS

Features of example implementations of the invention will become apparent from the description, the claims, and the accompanying drawings in which:

DETAILED DESCRIPTION

Beamsplitters have been used to combine multiple displays, but only to merge the component displays into a virtual display in which each component display is coincident with the other component displays. For example, U.S. Pat. No.

6,703,988, the disclosure of which is hereby incorporated by reference, discloses a system that merges two component displays into the same light path for 3D left eye and right eye views. Beamsplitters have also been used to attain the large number of pixels required for holographic displays.

Figure 1:
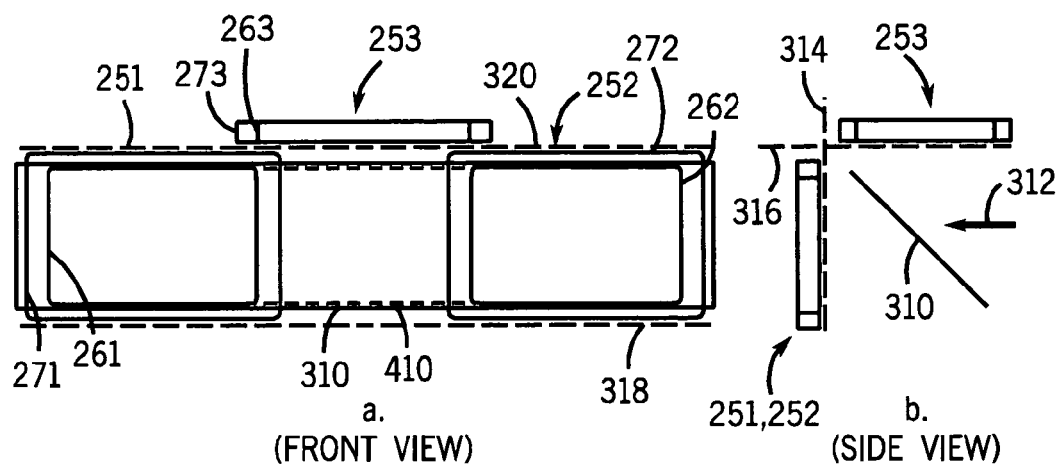
FIG. 1 shows a representation of one implementation of three component displays in a single high-resolution display using a beamsplitter.

An embodiment of the invention is a system that uses a beamsplitter to seamlessly combine multiple component displays into a single high-resolution display. FIG. 1 shows the combination of three component flat-panel displays into a single high-resolution display using a beamsplitter according to an embodiment of the invention. Three component displays 251, 252, and 253 are positioned such that the component display areas 261, 262, and 263 are abutted against one another along a first (e.g., horizontal) dimension. In alternative embodiments, the component displays may be abutted against one another along an alternate dimension, such as a vertical or diagonal dimension.

The central component display 253 is positioned in a reflected manner about a plane of symmetry inclined to the left and right displays. A beamsplitter 310 is placed coincident with this plane of symmetry. In one embodiment, the bezel areas 271, 272, and 273 surrounding the component display areas are of a dark color. Then, if the monitors and beamsplitter are enclosed within a substantially light-tight enclosure, a viewer viewing the apparatus from the front sees a single composite image with three times the pixels of each component display. Specifically, the composite image is provided by the display areas 261 and 262 of the left and right displays as viewed through the beamsplitter, and the display area 263 of the central display as reflected area 410 from the beamsplitter. For example, the composite image comprises the display area 261, the reflected area 410, and the display area 262. Referring to FIG. 1b, the composite image may be viewed by a user along a forward direction 312.

The beamsplitter 310 in one example is positioned in a plane of symmetry between a first plane 314 and a second plane 316. The first plane 314 is orthogonal to the second plane 316. In one embodiment, a first set of component displays (e.g., component displays 251 and 252) are aligned along a first line 318 in the first plane 314. A second set of component displays (e.g., component display 253) are aligned along a second line 320 in the second plane 316, where the first line 318 is parallel to the second line 320. Additional component displays may be added alternately to the first set and the second set, as will be appreciated by those skilled in the art.

Figure 2:
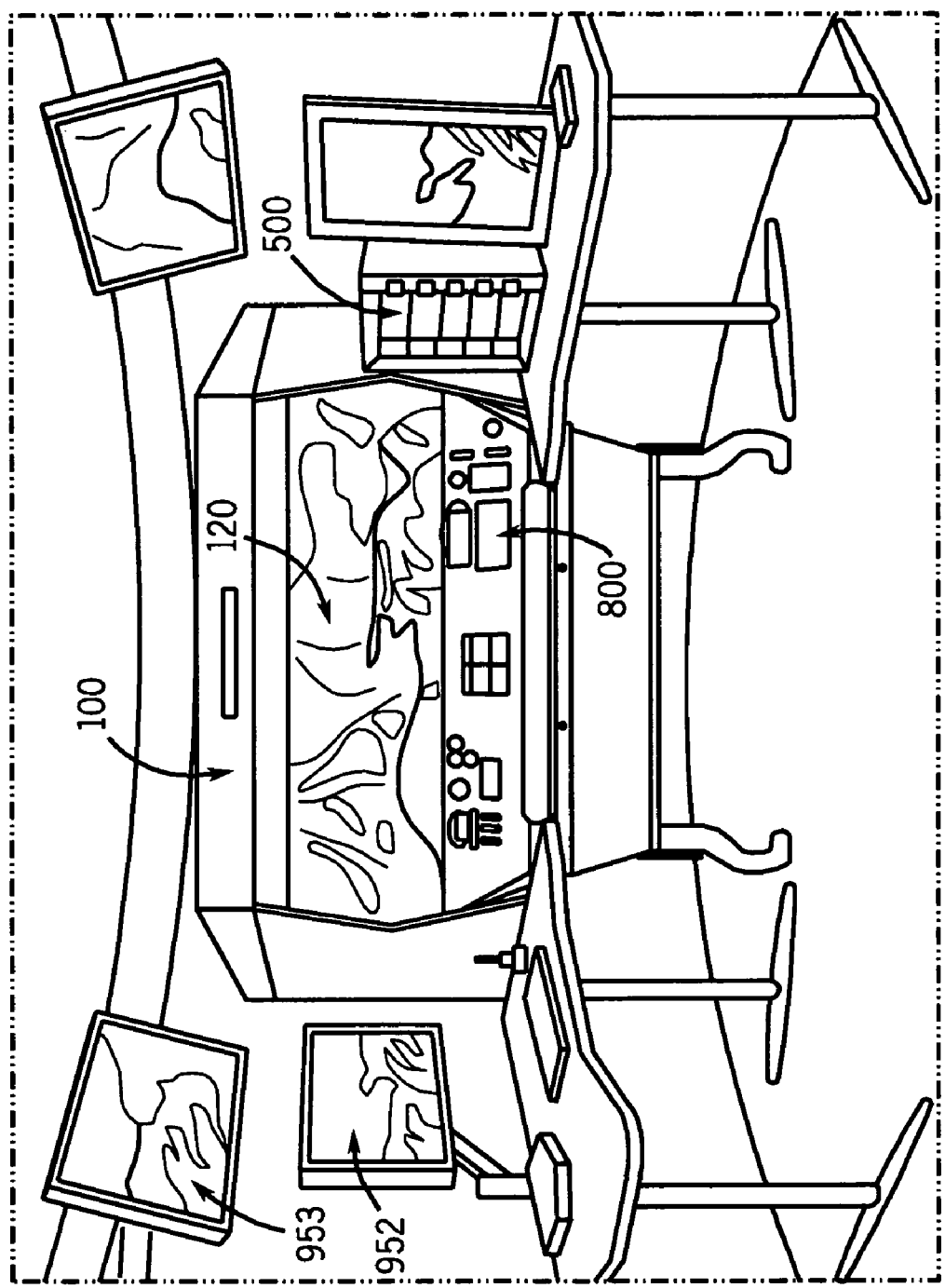
FIG. 2 shows a representation of one implementation of a system that comprises a high-resolution display, a knob console, and an infrared gesture interface.

Turning to FIG. 2, an analyst's workstation 100 comprises five component displays that are combined into a single high-resolution display 120 according to an embodiment of the invention. The component displays in one example are 30" diagonal Apple Cinema HD displays, each placed in a "portrait" orientation, with a 1600×2560 resolution. The combined high-resolution display thus has a resolution of 8000× 2560.

Figure 3:
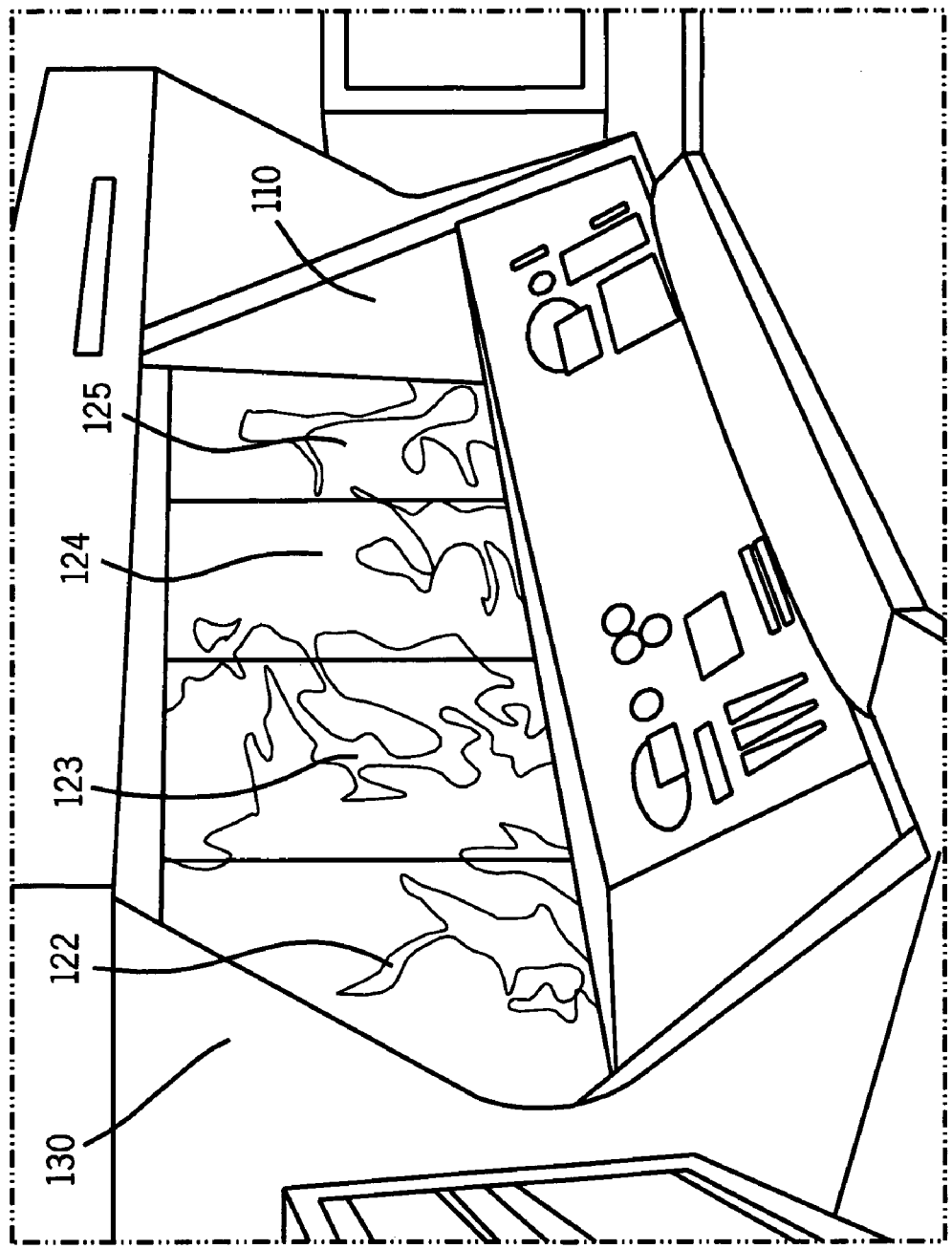
FIG. 3 shows a representation of an oblique view of the system of FIG. 2.
Figure 4:
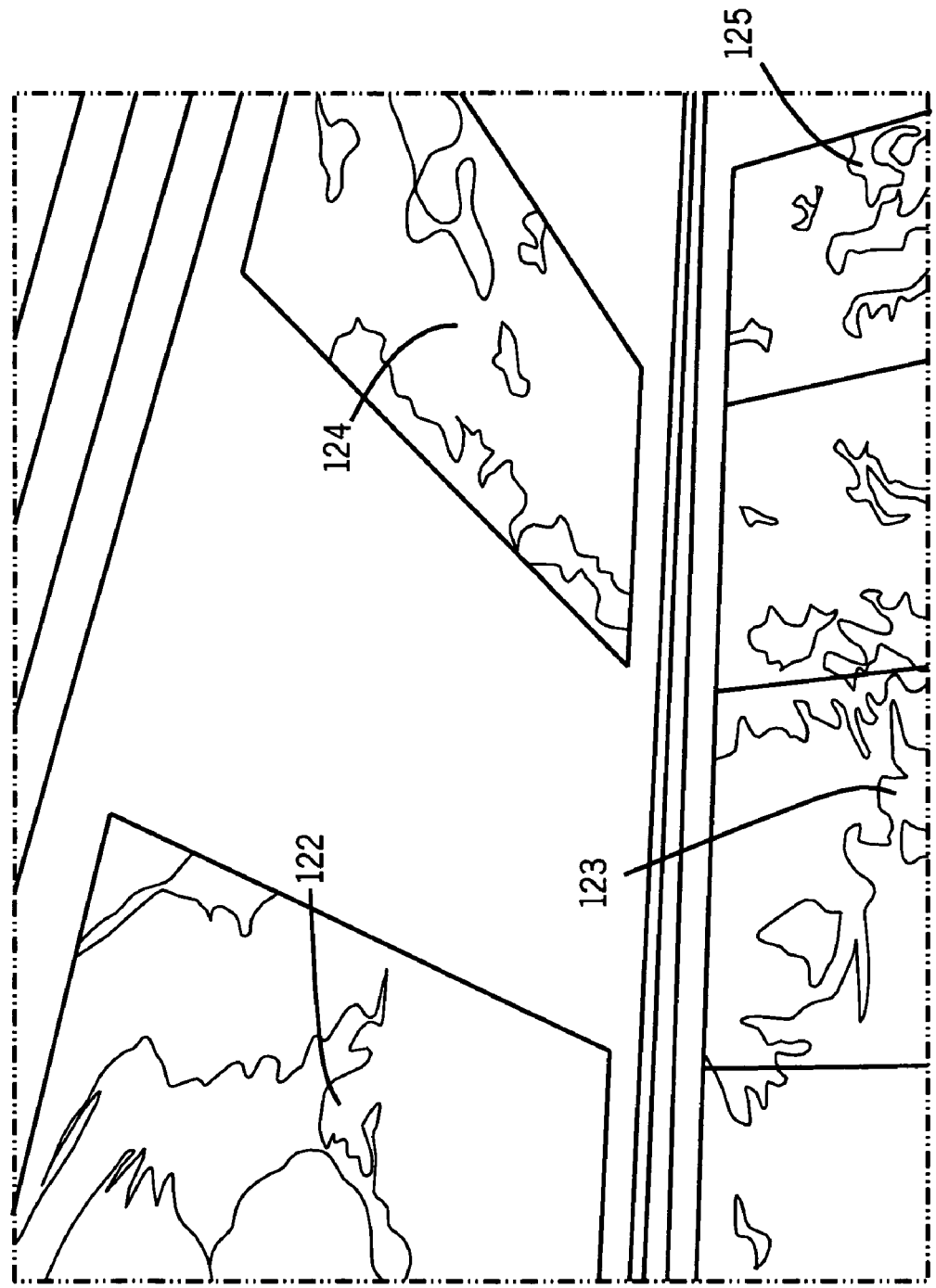
FIG. 4 shows a representation of an upward oblique view of the system of FIG. 2.

FIG. 3 shows an oblique view of the workstation of FIG. 2. The color balance of the component monitors has been altered to highlight the seams between adjacent component monitors. In the geometry of this particular workstation, component displays 122 and 124 are positioned in a horizontal plane above the beamsplitter 310 and are viewed as reflected from the beamsplitter. Component displays 123 and 125 are positioned in a vertical plane behind the beamsplitter and are viewed through the beamsplitter. (A fifth component display is positioned in a similar manner, but is not shown.) The relative position of the component displays and beamsplitter is shown in FIG. 4, which shows a upward oblique view of the workstation of FIG. 2. In this embodiment, the first plane 314 comprises a vertical plane and the second plane 316 comprises a horizontal plane. The beamsplitter 310, positioned at a 45 degree angle to both the vertical and horizontal planes is a 50% transmissive, 50% reflective beamsplitter, ensuring uniform brightness across the entire combined high-resolution display. The first set of component displays comprises displays 123 and 125. The second set of component displays comprises displays 122 and 124.

The beamsplitter 310 in one example is manufactured using a metal coating such as a nickel alloy coating. Thin film coatings may be used, but may cause color variations observed with changing viewing angle. In one example, the beamsplitter 310 comprises a trapezoidal, balanced (30% reflective, 30% transmissive), half-silvered mirror (nickel alloy metal deposition on water-white glass). In a further example, an anti-reflective coating is also applied to the side of the glass opposite the nickel coating.

Also shown in FIG. 3, a hood 130 substantially encloses the five component displays and the beamsplitter 310. As noted above, the hood serves to keep stray light from illuminating the display bezels. This, combined with a dark coloring of the bezels, ensures that the combined high-resolution display is substantially seamless (as shown in FIG. 2), free of artifacts that would result should a light color bezel be seen through or reflected from the beamsplitter. Since the beamsplitter may reduce the light from each display by 50%, the display brightness may be increased correspondingly to compensate, though this adjustment may not be necessary due to the reduction in ambient light provided by the hood. If the component displays cannot provide sufficient brightness, brighter and more numerous backlighting elements may be installed. The power supply and cooling capabilities may be upgraded to handle the increased wattage and heat buildup.

In some embodiments of the invention, the component displays 251, 252, and 253 are LCDs that emit polarized light, as will be understood by those skilled in the art. For many surfaces, the fraction of polarized light that is reflected, absorbed, or transmitted is based on the incident angle. Consequently, the brightness of the component displays 251, 252, and 253 may vary between opposing edges of the display areas 261, 262, and 263. For example, in the embodiment of FIGS. 2-4, the greatest variation in brightness may be observed from top to bottom of the component displays due to the comparatively large difference in incident angle of the optical pathways between the viewing location and the pixels at the top and bottom of the component displays.

Typically, the magnitude of the observed variation in brightness is small. However, it is possible for the sense of the variation to vary between adjacent displays. For example, the component displays viewed in transmission may appear brighter at the bottom while the component displays viewed in reflection may appear darker at the bottom. When the comparatively bright bottoms of the transmitted component displays are abutted against the comparatively dark bottoms of the reflected component displays, even a small variation may be noticeable by the user.

To mitigate this variation in brightness, a retarder 602 may be placed between the front surface of each component display 251, 252, and 253 and the beamsplitter 310. The retarder 602 in one example comprises a quarter-wave film that may be inserted behind a bezel 170, oriented approximately 45 degrees offset from the LCD plane of polarization. In this configuration, the light emitted from the LCD is circularly polarized, greatly reducing the variation in reflection, absorption, and transmission noted above. Other retarders (e.g. half-wave films) at other orientations may also be used.

In some embodiments of the invention, the variation in brightness may be greater for either the component displays viewed in transmission or the component displays viewed in reflection. In such instances, it may be sufficient to place quarter wave plates in front of only those component displays where the effect is greatest.

The above methodology alone provides a satisfactory high-resolution display that renders a seamless image when viewed directly from the front (perpendicular to the vertical plane). However, if a user views the high-resolution display from an oblique angle, the high-resolution display may appear to contain dark strips at the seams between adjacent component displays.

Figure 5:
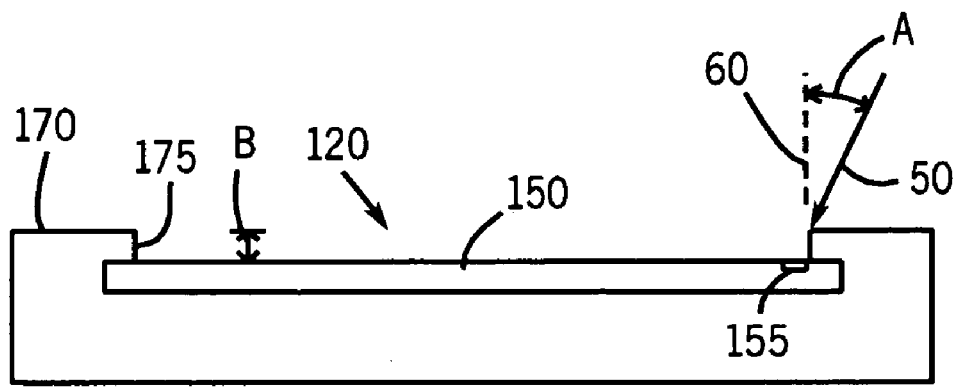
FIG. 5 shows a representation of one implementation of a cross-section of a component display of FIG. 1.

FIG. 5, which shows a cross-section of a typical flat-panel component display, illustrates the origin of this phenomenon. The display 120 contains a light-modulating element 150 (for example a LCD assembly) that is surrounded by a bezel 170. In the majority of flat panel displays, the upper surface of the light-modulating element is recessed below the upper surface of the bezel, creating an offset 175 of thickness B. When the viewing angle 50 of the user departs from a normal 60 to the surface of the light-modulating element, a small band of pixels 155 adjacent to the bezel is occluded, giving rise to the dark bands described above. The occlusion problem may be addressed in one of three ways. In one approach, the thickness of the bezel, b, is minimized or eliminated during display selection or through removal of the bezel (if permitted by the display design). In a second approach, each bezel adjacent to a seam within the combined high-resolution display is beveled back from vertical by an angle A equal to the maximum anticipated departure of the user's sight line from the normal to the component display.

Figure 6:
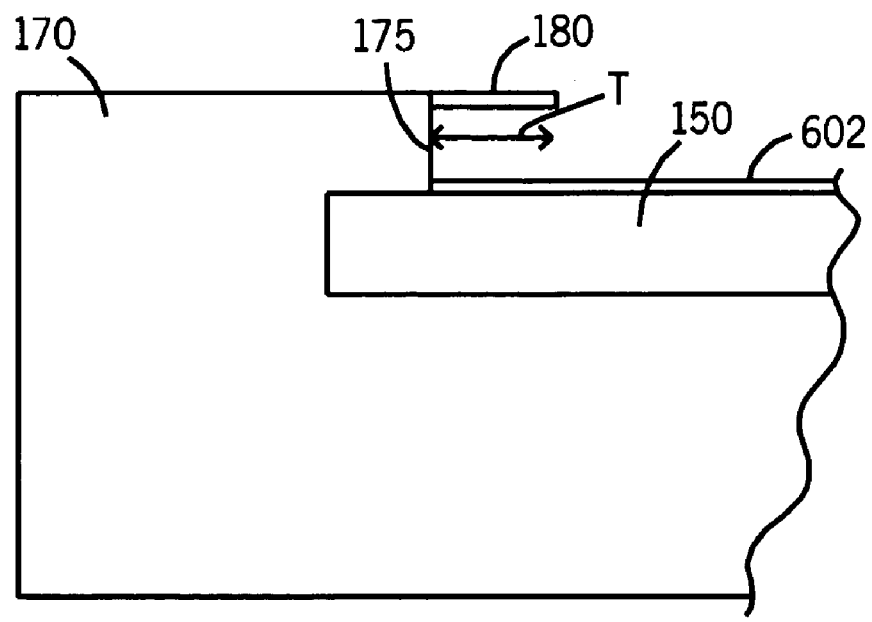
FIG. 6 shows a representation of one implementation of a cross-section of a component display with an overhang.

FIG. 6 shows a third approach to the occlusion problem in which an overhang 180 comprises a strip of thin opaque material that is mounted on each bezel edge that lies adjacent to another display. The strip of material overhangs the light-modulating element 150 by a distance T. The distance t is defined by the anticipated departure of the viewing angle from the display normal and the thickness of the bezel. Specifically, T=B tan(A). Additionally, a strip of pixels of thickness M=2T is repeated across component displays adjacent to a seam within the combined high-resolution display. When the combined high-resolution display is viewed from an oblique angle, a user sees a portion of the repeated pixel strip beneath the strip of opaque material on one of the adjacent displays. The user's view of the same portion of the repeated pixel strip on the adjacent display is blocked by the opaque strip. At any one viewing angle, each pixel within the repeated strip is blocked on one of the two adjacent component displays and visible on the other. Thus, regardless of viewer position, a seamless image, free of occlusion, is presented on the combined high-resolution display.

Figure 7:
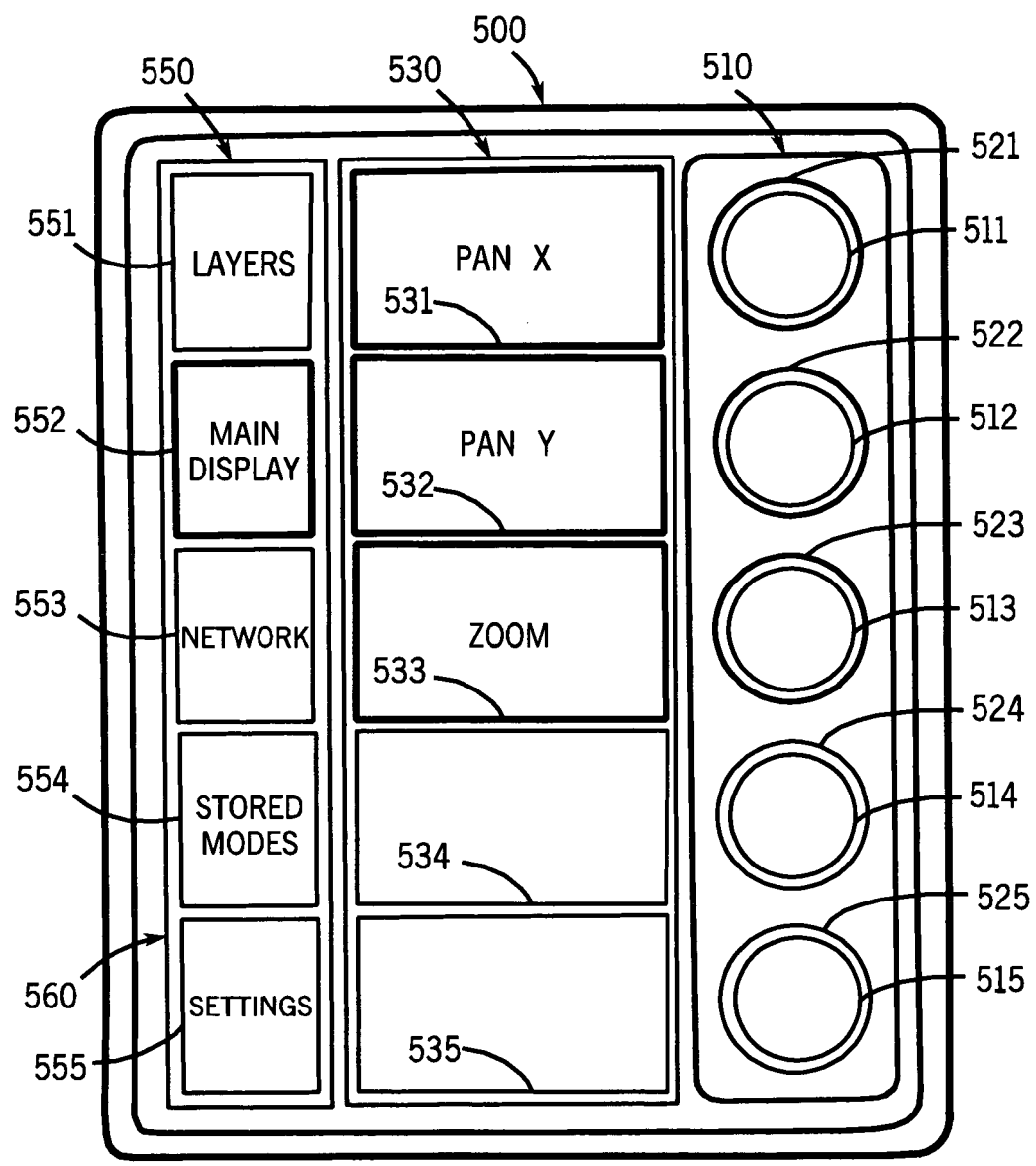
FIG. 7 shows a representation of one implementation of a knob console.
Figure 9:
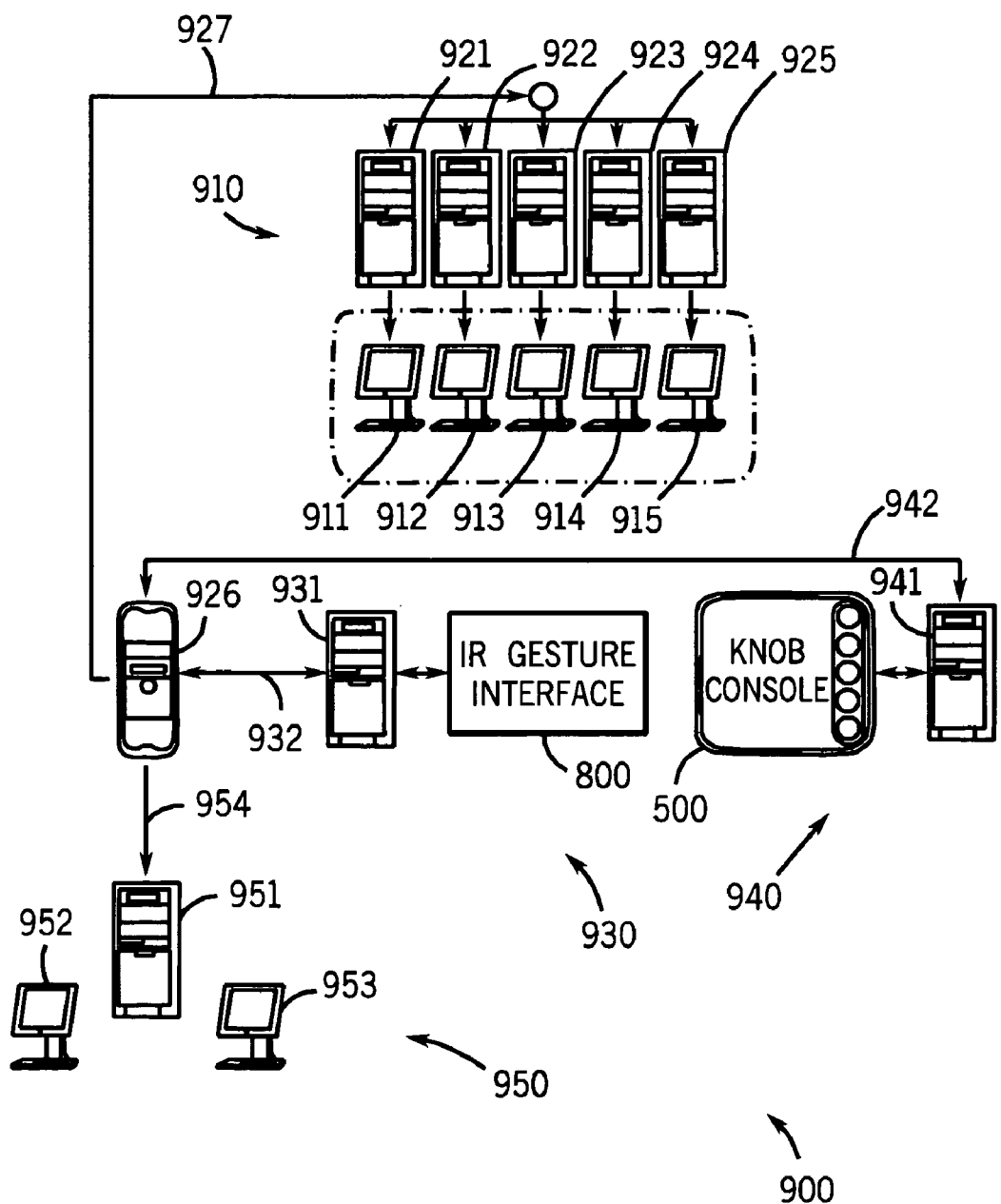
FIG. 9 shows a functional block diagram according to an embodiment of the invention.

Turning to FIG. 7, a knob console 500 in one example is configured to control imagery displayed on a high resolution display 910 (FIG. 9). The knob console 500 serves to provide an intuitive yet full featured set of controls through which a user can manipulate the display behavior. The knob console 500 comprises a control mode menu 550, a set of knobs 510, and a corresponding set of function labels 530. The control mode menu and set of function labels in one example are presented on a touch-sensitive LCD panel 560. The particular control modes and function labels presented to the user may thus be specified by the system designer in software. The set of knobs 510 comprises knobs 511, 512, 513, 514, and 515. Each knob 511, 512, 513, 514, and 515 in one example comprises a knob illuminator 521, 522, 523, 524, and 525, respectively. The set of function labels 530 comprises function labels 531, 532, 533, 534, and 535.

The control mode menu presents the user with one or more control mode buttons 551, 552, 553, 554, and 555. Referring to the embodiment of FIG. 7, the control mode buttons 551, 552, 553, 554, and 555 are labeled "Layers", "Main Display", "Network", "Stored Modes", and "Settings", respectively. To activate a particular control mode, the user touches the corresponding control mode button. Once a control mode button is selected, one or more of the knobs within the set of knobs is activated, each assigned a predetermined function based on the selected control mode, and a corresponding number of functions labels is displayed within the set of function labels. To indicate which of the knobs are active, the active knobs are illuminated by the corresponding knob illuminator.

For example, in FIG. 7, the user has selected the main display control mode by pressing the Main Display control mode button 552. Once selected, the Main Display control mode button is highlighted. The first three knobs 511, 512, and 513 are activated and assigned Pan X, Pan Y, and Zoom functions, as indicated by the function labels 531, 532, and 533, respectively. For example, as the user rotates the first knob 511, the display is panned in the x-direction at a rate proportional to the rate of knob rotation. To indicate that the first three buttons are active controls in the Main Display control mode, the first three knob illuminators 521, 522, 523 are illuminated.

The selection of other control modes is performed in a similar manner. For example, should the user select the Layers control mode by touching the Layers control mode button 551, the buttons are assigned functions appropriate for control of imagery layers on the display, and a corresponding set of function labels is displayed. For example, in the layers control mode, all five knobs may be activated and assigned functions Select Layer, Transparency, Red Intensity, Blue Intensity, and Green Intensity. The first knob thus allows the user to select the imagery layer to be controlled, and the last four knobs allow the user to adjust the overall visibility and color balance of the selected layer.

To aid the user in navigating the above described control scheme, the menu buttons, function labels, and knob illuminators in one example are color-coded. More specifically, the control mode buttons are each assigned a unique color. When a particular control mode is selected, the knob illuminators illuminate the activated knobs with the color of the corresponding control mode button. This may be achieved through the use of red, green, and blue light emitting diodes (RGB LED's) within each knob illuminator. A user or software program can set an individual value for each of the red, green, and blue LEDs to display a desired color.

The control knobs in one example are configured to provide haptic feedback or force-feedback. The haptic feedback may be provided by a control loop that comprises an optical encoder and a torque actuator coupled to the knob shaft. A knob console computer 941 (FIG. 9) in one example comprises a control algorithm that monitors one or more of the position, velocity, and the acceleration of the knob, as determined via the optical encoder. The control algorithm actuates the knob based on a physics model. Any number of physics models may be used, including those providing simulated friction, inertia, and detents. The particular physical model selected is based on the function assigned to the knob. For example, in the Layers control mode described above, the first knob, which selects among a discrete set of imagery layers, may provide simulated detents, with each detent corresponding to an imagery layer. Similarly, simulated inertia and friction may be appropriate for panning motions.

Figure 8:
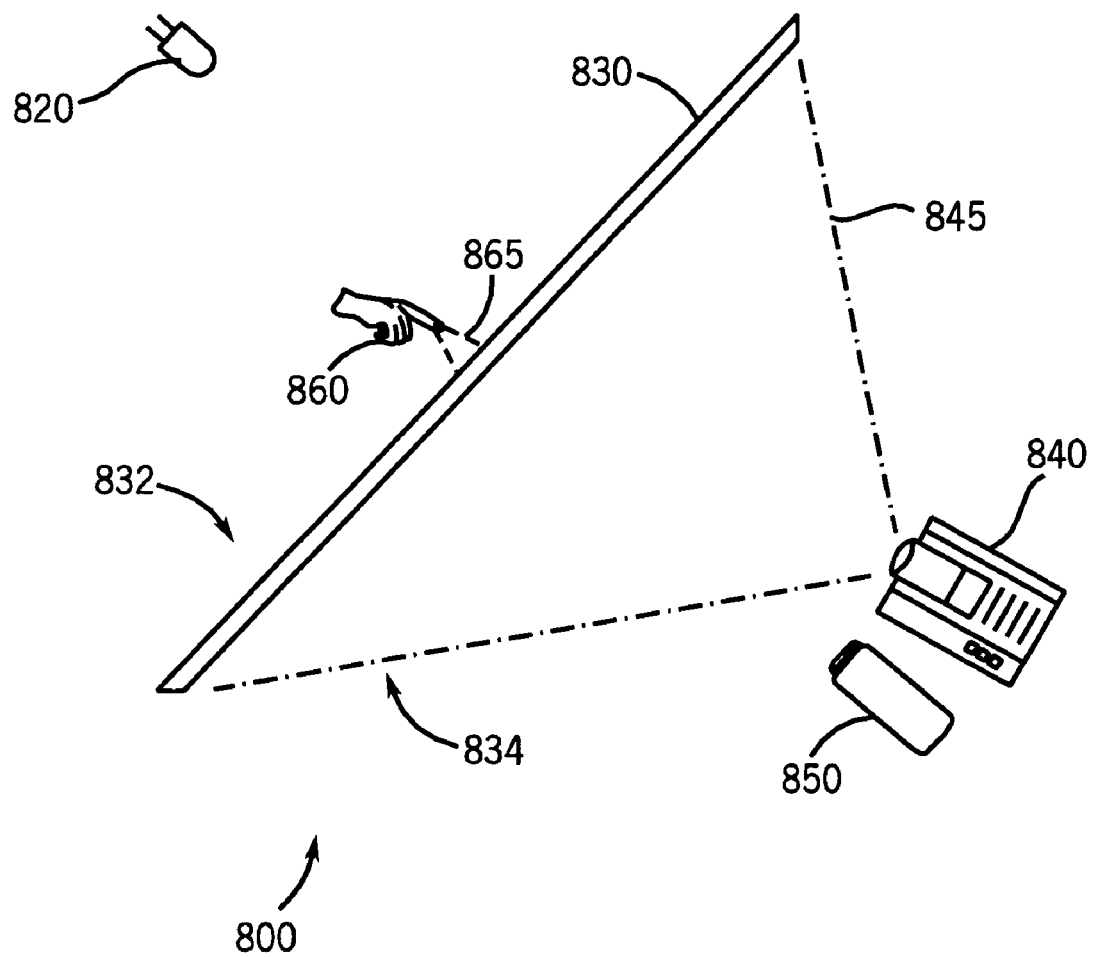
FIG. 8 shows a representation of one implementation of an infrared gesture interface.

FIG. 8 shows a schematic view of an infrared gesture interface 800 according to an embodiment of the invention. The infrared gesture interface 800 in one example provides a user interface to the high resolution display 910. As recognized in certain touch display systems, such as Sony's Smart-Skin capacitance table, z-axis recognition (i.e., the distance of the hand from the display surface in a direction perpendicular to the display surface) may be useful for such gestures as distinguishing between a mouseover and mouse button press and for "picking up" and "dropping" an object. The infrared gesture interface 800 in one example comprises an infrared light source 820, a diffusion surface 830, a visible light projector 840, projected imager 845, and an IR-sensitive camera 850.

The infrared light source 820 illuminates the diffusion surface 830, such as a rear projection screen, from a front side 832 on which the user is positioned. The diffusion surface is at least partially transparent to infrared and visible light. The visible light projector 840 projects the imagery 845 onto a back side 834 of the diffusion surface 830. Alternatively, the visible light projector may project imagery onto the front side of the diffusion surface, though this configuration is not preferred as the user will case shadows within the projected imagery. In either case, the projector 840 may be equipped with an IR cut filter that eliminates the emission of IR light.

The IR-sensitive camera 850 is focused on the rear 834 of the diffusion surface 830. The IR camera 850 sees the diffuser illuminated with the IR source, resulting in a bright IR backdrop. The IR-sensitive camera 850 in one example comprises a visible light camera with an IR band- or notch-pass filter, such as a charge-coupled device chip. Objects approaching the surface, such as the finger of a user's hand 860, will block the IR source and throw a shadow 865 on the diffusion surface 830. The more closely the object approaches the diffusion surface 830, the sharper the edges of the shadow 865 will become. Since, because of the IR cut filter, the IR illumination is unaffected by the visible light projector, the sharpness of the shadow is a reliable measure of the object's distance from the diffusion surface in a direction perpendicular to the surface. The sharpness is detectable by analyzing the spatial frequency of the imagery acquired by the camera 850, with higher spatial frequency content corresponding to increased sharpness. This measure of sharpness is often measured directly by auto-focus systems, and in some embodiments may be obtained from an existing auto-focus system onboard the camera. The distance information acquired in this manner may be used for advanced 3-dimensional gesture recognition capabilities that do not require physical contact with the diffusion surface 830. For example, a momentary mouse-over gesture could be simulated by waving a finger over an object, and the object could be selected by tapping the surface.

Turning to FIG. 9, a representation of one embodiment of a work station 900 in one example comprises a high resolution display 910, a user interface 930 and 940 for interaction with the displays, and an auxiliary display component 950. The high resolution display 910 in this embodiment comprises five component displays 911, 912, 913, 914, and 915 that are interleaved and abutted side by side. When these five component displays are combined as described above with reference to FIG. 1, the result yields a single high-resolution display.

Each component display 911, 912, 913, 914, and 915 in one example is driven by one or more component display computers 921, 922, 923, 924, 925. Each of the five computers receives information from a state computer 926 that keeps track of the current state of the workstation 900. The state of the workstation comprises displayed content of the high resolution display 910, interfaces 930 and 940 offered to the user, and user input that is provided back through the interfaces 930 and 940. The state computer 926 provides instructions to the component display computers 921, 922, 923, 924, and 925 through a communication pathway 927. The state computer 926 in one example does not receive any information from the component display computers.

Referring to the implementation of FIG. 9, there are two interfaces that allow the user to control the high-resolution display. The user interface 940 comprises the knob console 500 and a knob console computer 941. The knob console computer 941 in one example comprises software that determines what control mode buttons will be presented in the control mode menu and also what labels would be put on the function labels, what knobs will be illuminated and as also mentioned there is a control algorithm for providing force feedback to the knobs. The knob console computer 941 communicates with the state computer 926 through communication pathway 942. Communication pathway 942 comprises a two directional communication to allow the knob console computer to send instructions to the state computer 926 and receive information for display on the control mode menu 550 of the knob console 500.

The user interface 930 comprises the infrared gesture interface 800 and an infrared gesture interface computer 931. The infrared gesture interface 800 in one example allows the user to execute gestures that provide instructions to the state computer 926 that will then provide appropriate instructions to the high resolution display 910. It allows the users to execute gestures that will control the behavior of the high-resolution display. The infrared gesture interface computer 931 in one example comprises a two-way communication pathway 932 with the state computer 926 to send instructions to and receive instructions from the state computer 926.

The auxiliary display component 950 in one example comprises an auxiliary display computer 951 and one or more auxiliary displays 952 and 953. The auxiliary display computer 951 receives information from the state computer 926 through communication pathway 954. The auxiliary display component 950 may be used for alternate views of the composite image or additional images and/or menus.

Figure 10:
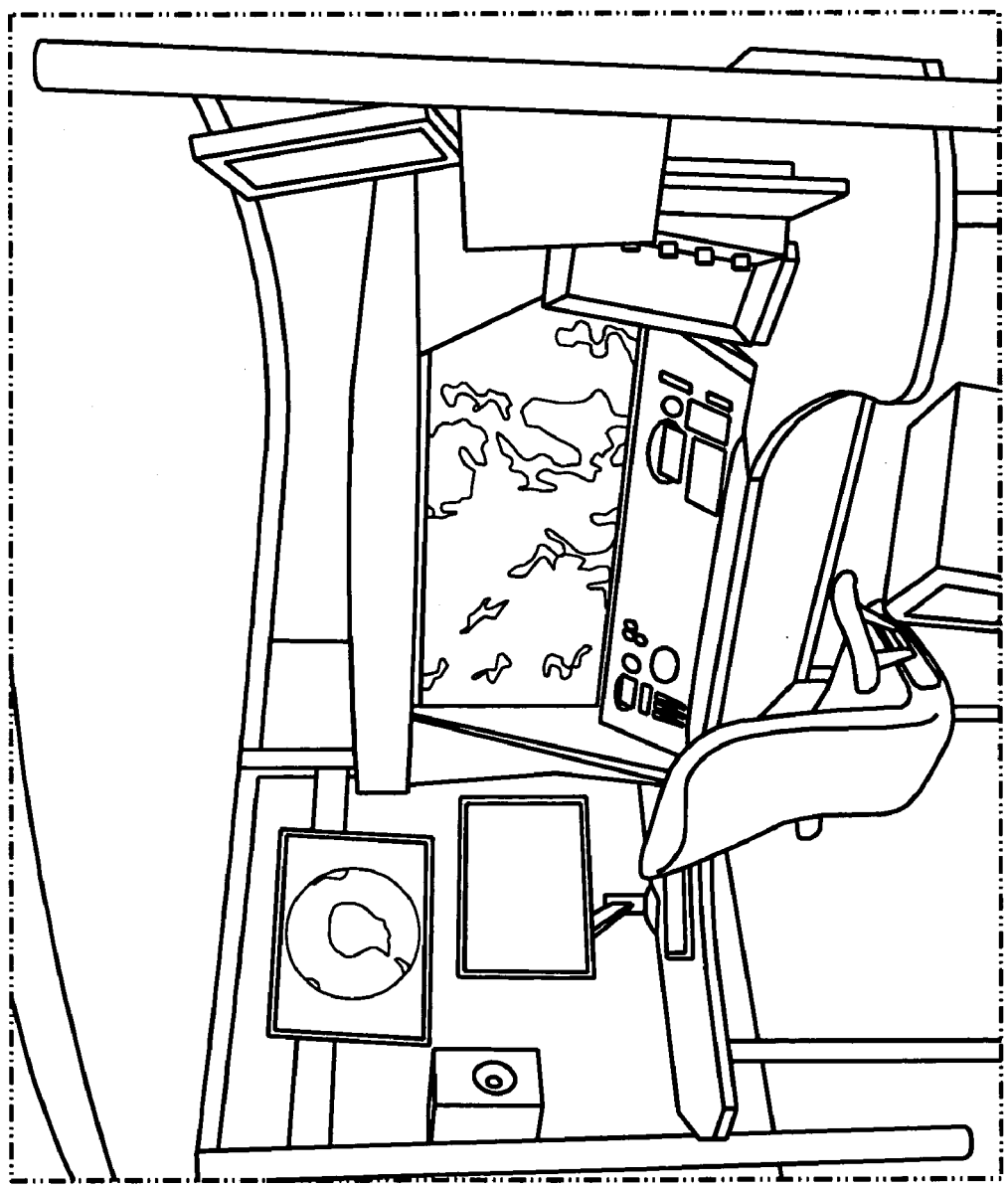
FIGS. 10-12 show additional views of the system of FIG. 2.
Figure 11:
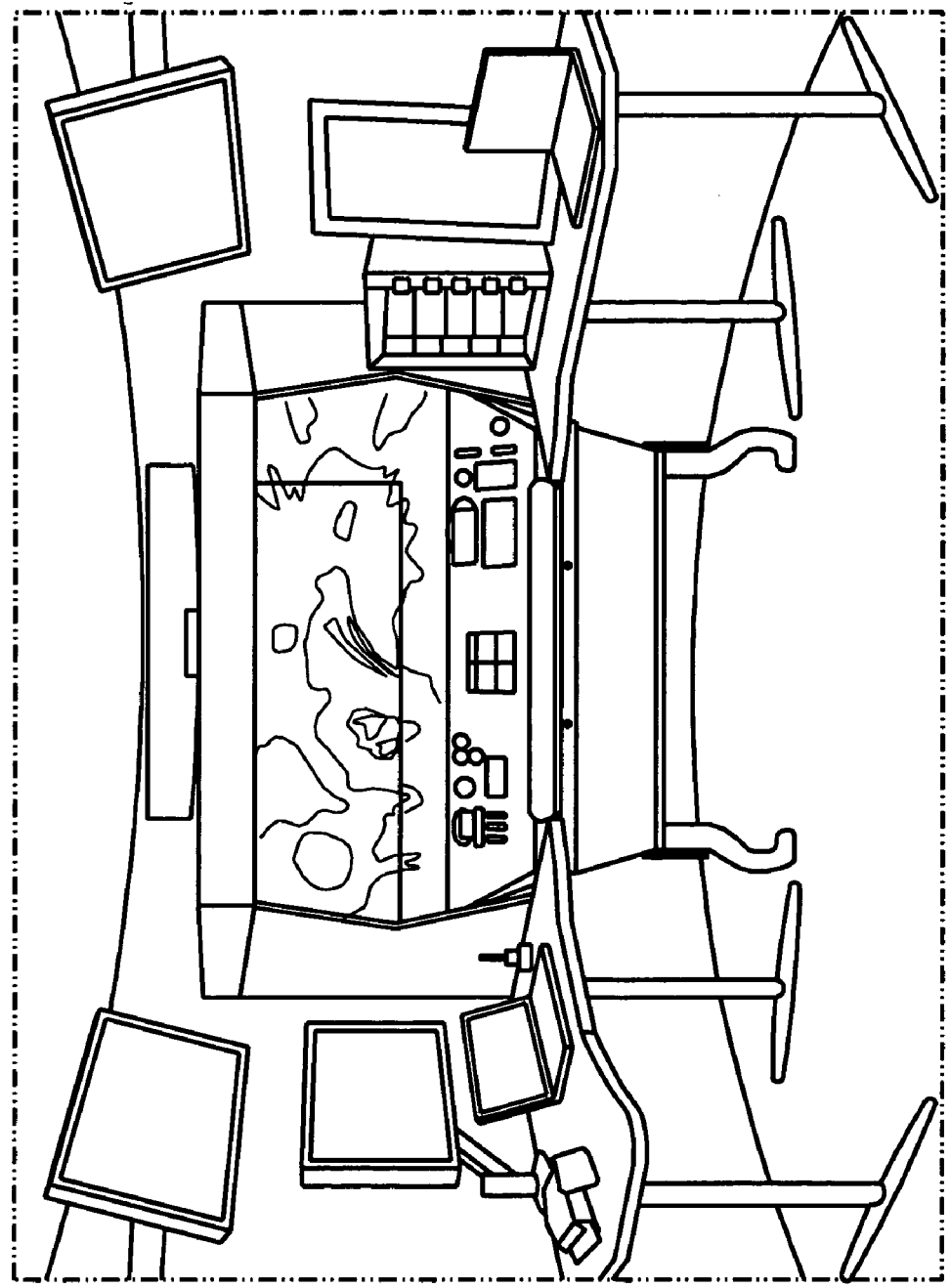
Figure 12:
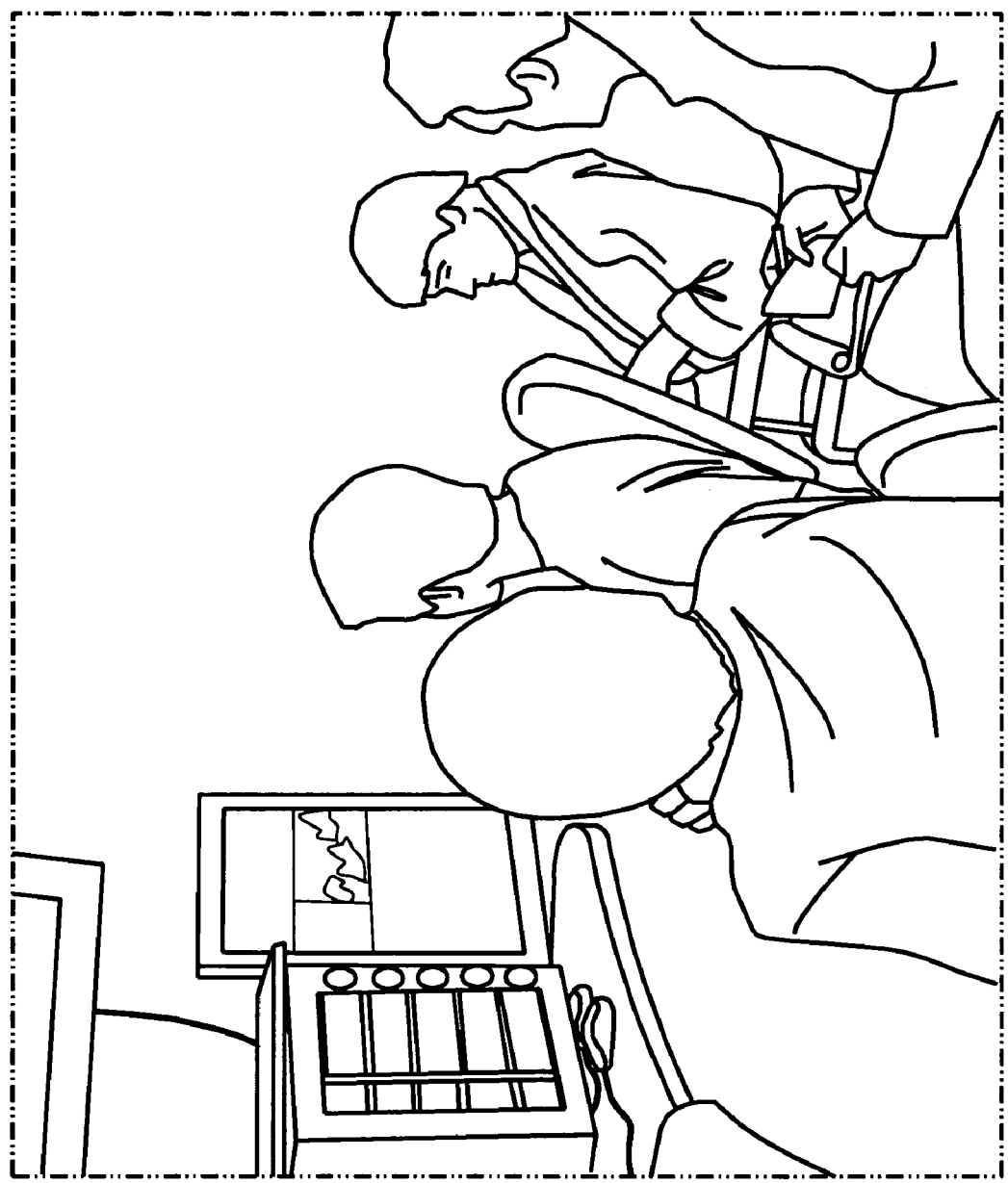

FIGS. 10-12 show further examples of the analyst's workstation 100.

What is claimed is:

1. An apparatus, comprising:
   a first component display with a first display area, a second component display with a second display area, and a beamsplitter;
   wherein the first component display is positioned in a first plane such that the first display area is viewable through the beamsplitter as a transmitted display area;
   wherein the second component display is positioned in a second plane such that the second display area is viewable from the beamsplitter as a reflected display area;
   wherein the first component display, the second component display, and the beamsplitter are positioned such that the beamsplitter provides a composite image of the transmitted display area and the reflected display area, wherein the reflected display area of the composite image is at least partially offset from the transmitted display area of the composite image along a line that intersects the first and second plane.

2. The apparatus of claim 1, wherein the first component display and the second component display are positioned such that the transmitted display area abuts the reflected display area along a horizontal or vertical seam within the composite image.

3. The apparatus of claim 2, wherein the first component display comprises a first bezel that surrounds the first display area, wherein the second component display comprises a second bezel that surrounds the second display area;

wherein the transmitted display area abuts the reflected display area at a vertical seam;

wherein an edge of the first bezel comprises a first overhang and an edge of the second bezel comprises a second overhang along the vertical seam;

wherein the first and second overhangs comprise a width T, wherein the first display area and the reflected area comprise a repeated image portion of width 2T such that at an oblique angle to the composite image, a portion of the repeated image portion is visible from beneath one of the first and second overhangs and blocked by the other of the first and second overhangs.

4. The apparatus of claim 3, wherein the width T of the first and second overhangs is based on a desired maximum viewing angle A and a thickness of the first and second bezels B according to: T=B tan (A).

5. The apparatus of claim 1, wherein the beamsplitter is positioned in a plane of symmetry between the first component display and the second component display.

6. The apparatus of claim 5, wherein the first component display is positioned at a ninety degree angle relative to the second component display;

wherein the first component display is positioned at a forty-five degree angle relative to a first side of the beamsplitter;

wherein the second component display is positioned at a forty-five degree angle relative to a second side of the beamsplitter.

7. The apparatus of claim 1, wherein the first component display comprises a first bezel that surrounds the first display area, wherein the second component display comprises a second bezel that surrounds the second display area;

wherein the first component display and the second component display are positioned such that the transmitted display area overlaps a portion of the second bezel and the reflected display area overlaps a portion of the first bezel when viewed from the beamsplitter.

8. The apparatus of claim 7, wherein the first bezel and the second bezel comprise a relatively dark color;

wherein the first component display, the second component display, and the beamsplitter are enclosed within a substantially light-tight enclosure to reduce illumination of the first bezel and the second bezel.

9. The apparatus of claim 1, wherein the first component display comprises a first bezel that surrounds the first display area, wherein the second component display comprises a second bezel that surrounds the second display area;

wherein the first component display and the second component display are selected such that a thickness of the first and second bezel is minimized or the bezel is removed.

10. The apparatus of claim 1, wherein the first component display comprises a first bezel that surrounds the first display area, wherein the second component display comprises a second bezel that surrounds the second display area;

wherein a portion of the first bezel and the second bezel adjacent to a seam in the composite image are beveled back from vertical by an angle equal to a maximum anticipated departure of a user's sight line from a normal to the composite image.

11. The apparatus of claim 1, wherein the beamsplitter is approximately 50% reflective and 50% transmissive.

12. The apparatus of claim 11, wherein the first component display and the second component display comprise an increased display brightness that compensates for a reduced light intensity from the beamsplitter.

13. The apparatus of claim 1, further comprising:

a first set of at least one component display that comprises the first component display and a second set of at least one component display that comprises the second component display;

wherein the first set of at least one component display is positioned in a first plane and the second set of at least one component display is positioned in a second plane;

wherein the first set of at least one component display is horizontally interleaved with the second set of at least one component display;

wherein the beamsplitter is positioned in a plane of symmetry between the first plane and the second plane such that the first set of at least one component display is viewable through the beamsplitter and the second set of at least one component display is viewable as a set of reflected areas from the beamsplitter to form the composite image, wherein the set of reflected areas comprise the reflected area.

14. The apparatus of claim 13, wherein the first and second sets comprise at least three component displays.

15. The apparatus of claim 1, further comprising at least one retarder positioned between the beamsplitter and at least one component display of the first component display and the second component display.

16. The apparatus of claim 15, wherein the retarder comprises a quarter-wave film.

17. The apparatus of claim 16, wherein the at least one component display comprises at least one liquid crystal display (LCD);

wherein the quarter-wave film is positioned at a 45 degree offset from a polarization plane of the at least one LCD.

18. The apparatus of claim 1, wherein the transmitted display area provides a first image when viewed along a first direction and the reflected display area provides a second image when viewed along the first direction;

wherein the composite image comprises the first image and the second image;

wherein the first component display, the second component display, and the beamsplitter are positioned such that the first image abuts the second image along a seam within the composite image.

19. The apparatus of claim 1, wherein the first component display, the second component display, and the beamsplitter are positioned such that the transmitted display area and the reflected display area are horizontally interleaved when viewed from a first direction.

20. An apparatus, comprising:

a beamsplitter positioned in a plane of symmetry between a first plane and a second plane, wherein the first plane is orthogonal to the second plane;

a first set of component displays aligned along a first line in the first plane; and a second set of component displays aligned along a second line in the second plane, wherein the first line is parallel to the second line;

wherein each component display of the first set of component displays comprises a light-modulating element viewable through the beamsplitter as a transmitted display area, and wherein each component display of the second set of component displays comprises a light-modulating element viewable reflected from the beamsplitter as a reflected display area;

wherein the first set of component displays and the second set of component displays are spaced apart along the first and second lines, respectively, such that the transmitted display areas of the first set of component displays are interleaved with the reflected display areas of the second set of component displays to provide a substantially seamless composite image displayed across the first and second set of component displays.

21. The apparatus of claim 20, further comprising:

a hood that substantially encloses the first set of component displays, the second set of component displays, and the beamsplitter and configured to provide a substantially light-tight enclosure.

22. The apparatus of claim 20, wherein the first set of component displays comprises a first component display, wherein the second set of component displays comprises a second component display, wherein the transmitted display area of the first component display is adjacent to the reflected display area of the second component display in the composite image;

wherein the first component display comprises a first bezel of thickness B that surrounds the light-modulating element of the first component display, wherein the second component display comprises a second bezel of thickness B that surrounds the light-modulating element of the second component display;

the apparatus further comprising:

a first overhang that comprises an outside edge mounted along a vertical edge of the first bezel and comprises an inside edge that extends over a first vertical strip of the light-modulating element of the first component display, wherein the first overhang comprises a width T between the inside edge and the outside edge, and a second overhang that comprises an outside edge mounted along a vertical edge of the second bezel and comprises an inside edge that extends over a first vertical strip of the light-modulating element of the second component display, wherein the second overhang comprises a width T between the inside edge and the outside edge;

wherein the first component display and the second component display are positioned such that the inside edge of the first overhang and the inside edge of the second overhang lie in a same vertical plane.

23. The apparatus of claim 22, wherein the width T of the first and second overhangs is based on a desired maximum viewing angle A and a thickness of the first and second bezels B according to: $T = B \tan(A)$.

24. The apparatus of claim 23, wherein the light-modulating element of the first component display and the light-modulating element of the second component display comprise a repeated image portion of width 2T such that at an oblique angle to the composite image, a portion of the repeated image portion is visible from beneath one of the first and second overhangs and blocked by the other of the first and second overhangs;

wherein the first component display is configured to display the repeated image portion over the first vertical strip of the light-modulating element of the first component display and an adjacent second vertical strip of width T;

wherein the second component display is configured to display the repeated image portion over the first vertical strip of the light-modulating element of the second component display and an adjacent second vertical strip of width T.

25. The apparatus of claim 20, further comprising:

at least one retarder positioned between the beamsplitter and at least one component display of the first set of component displays and the second set of component displays.

26. The apparatus of claim 25, wherein the retarder comprises a quarter-wave film.

27. The apparatus of claim 26, wherein the at least one component display comprises at least one LCD;

wherein the quarter-wave film is positioned at a 45 degree offset from a polarization plane of the at least one LCD.

28. The apparatus of claim 20, wherein the first and second sets comprise at least three component displays.

* * * * *